July 15, 1924.
F. HUMER
1,501,453
MEANS FOR ADJUSTING WINDOWS OF MOTOR CARS
Filed June 12, 1920    2 Sheets-Sheet 2
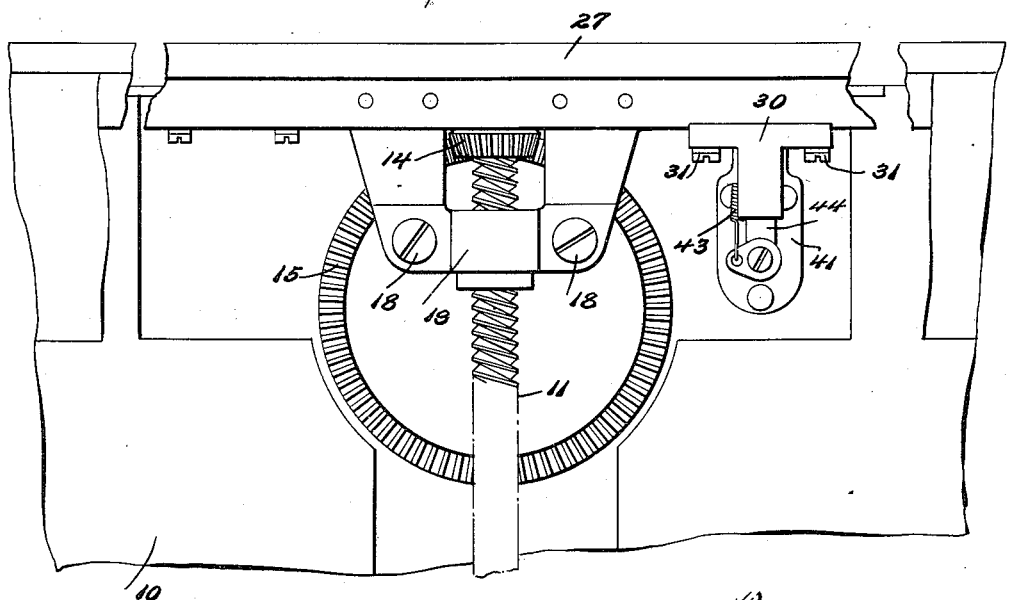
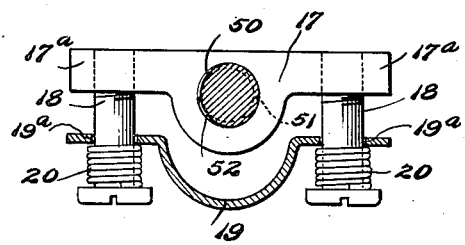
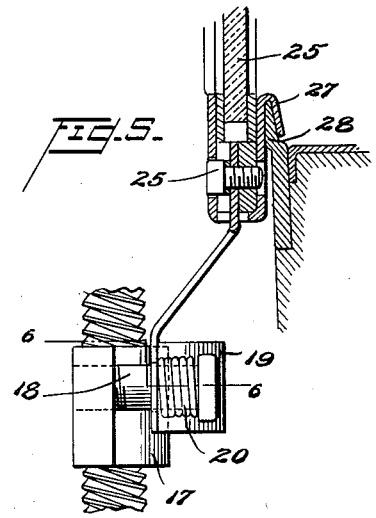
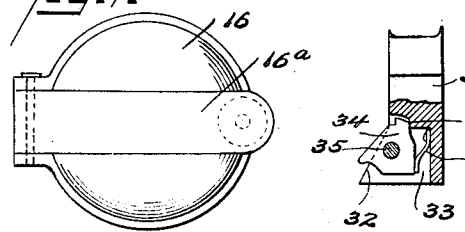
Inventor
Frank Humer
By Watson, Coit, Morse & Grindle
Attorneys Patented July 15, 1924.

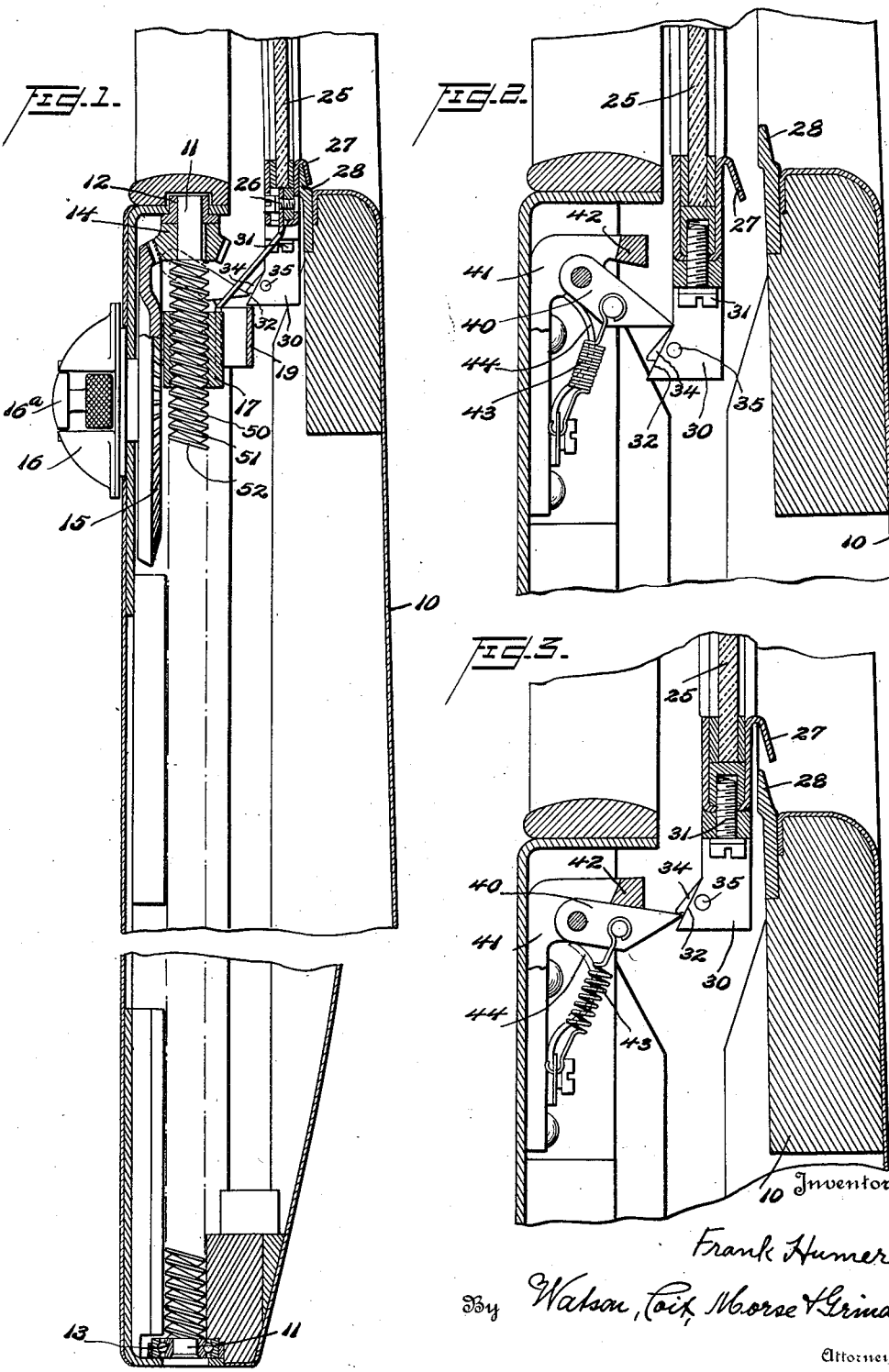

1,501,453

UNITED STATES PATENT OFFICE.

FRANK HUMER, OF DETROIT, MICHIGAN, ASSIGNOR, BY MESNE ASSIGNMENTS, TO LINCOLN MOTOR COMPANY, A CORPORATION OF DELAWARE.

MEANS FOR ADJUSTING WINDOWS OF MOTOR CARS.

Application filed June 12, 1920. Serial No. 388,494.

*To all whom it may concern:*

Be it known that I, FRANK HUMER, a citizen of Austria, and residing at Detroit, Wayne County, State of Michigan, have invented certain new and useful Improvements in Means for Adjusting Windows of Motor Cars, of which the following is a specification.

This invention relates to window operating mechanism and it has particular reference to mechanism for raising and lowering and holding in raised position the glass windows of motor cars and the like.

Mechanism of the kind referred to has heretofore been devised in which a threaded shaft is mounted in a part of the car and carries a collar or nut which is caused to move as the shaft is rotated, the window being secured to the collar and caused to move therewith. It is the object of the invention to provide a mechanism of this kind by which the windows can be more quickly opened or closed and by which they can be held in any position desired. A further object is to provide improved means for effectively securing or locking the windows in raised position.

The invention is described in the following specification and one embodiment thereof is illustrated in the accompanying drawings, in which:

Figure 1 is a sectional view of a part of a motor car body showing the general arrangement of the various parts of the mechanism;

Figure 2 is also a cross sectional view of a portion of a motor car body showing particularly the means employed for securing the window in raised position;

Figure 3 is a sectional view similar to Figure 2 showing the parts in a different position;

Figure 4 is a detailed elevational view showing the arrangement and relative location of certain parts of the mechanism;

Figure 5 is an enlarged detailed view partly in section showing certain detached parts of the mechanism illustrated at the upper portion of Figure 1;

Figure 6 is a sectional view on the line 6—6 of Figure 5;

Figure 7 is a detailed elevational view showing an arrangement of handle employed for rotating the shaft when raising and lowering the window;

Figure 8 is a detailed sectional view showing the arrangement and construction of a latch employed for holding the window in elevated position.

Referring to the drawings in detail, 10 represents a hollow panel of a motor car body or other construction to which the invention is applied. The panel, which may be a door or other part of a car body, may be made up of a series of upright members and cross members or other suitable parts in which the window slides and to which various parts of the operating mechanism are secured.

A shaft 11 is suitably journaled in bearings 12 and 13 in said panel. At its upper end said shaft carries a bevel gear 14 which meshes with a large bevel gear 15 rotatably mounted in a suitable bearing supported in the panel 10. Said gear 15 is provided with a suitable handle by which the same may be rotated, the handle preferably comprising a knob 16 to which an arm 16ª is pivotally secured, the arm being adapted to fold within a recess of the knob.

The shaft 11 is threaded in a manner hereinafter pointed out and a threaded collar 17 is mounted thereon. This collar is provided with wings 17ª having openings in which bolts 18 are secured. A yoke 19 is secured to said collar, this yoke being provided with openings 19ª through which the bolts 18 extend. Each of the bolts 18 is surrounded by a coiled spring 20 which is arranged between the heads thereof and the yoke 19, the result being that said yoke is yieldably held in contact with the collar.

At its upper end the yoke 19 is secured to the window 25. The window is arranged to slide in suitable guideways formed in the panel 10 of the motor car. The yoke may be secured to the window in any desired manner as by means of screws 26 passing therethrough and engaging the frame of the window.

Near its lower end the window is provided with a hook-shaped member 27 secured thereto in any suitable manner. The panel 10 of the car is provided with a member 28 which extends transversely across the bottom of the opening intended to be closed by the window 25. The member 28 forms a lip over which the hook-shaped member 27 is adapted to engage, said parts 27 and 28 forming means by which the window is held in an elevated position.

The springs 20 bearing against the yoke 19 normally hold the lower part of the window yieldingly in the plane in which the window is illustrated in Figure 2 of the drawing. In order to permit the hook-shaped member 27 to engage the lip 28 and to hold the window elevated, it is necessary to move the window laterally. Means are accordingly provided for giving the lower end of the window a lateral movement as it is raised and as it approaches the upper limit of its movement, and such means will now be described. A lug 30 is secured to the lower edge of the window by means of bolts 31 or in any other suitable manner. This lug is provided with an inclined portion 32 the function of which will later appear and at its lower end the lug 30 is provided with a recess 33 in which a latch 34 is pivotally mounted on a pivot pin 35. A spring 36 bears against the latch 34 and normally holds the same beyond the inclined surface 32 of the lug 30. A stop shoulder 37 is provided in said recess 33 for limiting the extent of outward movement of said latch. The purpose of the latch will later appear.

In the upper portion of the panel 10 a dog 40 is pivotally mounted on a bracket 41 suitably secured to a part of the panel, this bracket being provided with an abutment 42 which is adapted to limit the upward movement of the dog 40. A coiled spring 43 is secured to the dog 40 and to the bracket 41 this spring being arranged to resist upward movement of the dog. A flat spring 44 is also secured to the bracket 41 or any other suitable part and is arranged to bear against the underside of the dog 40 to prevent downward movement of the same beyond a certain limit.

From the foregoing construction it will be understood that as the shaft 11 is rotated the collar 17 will be caused to move one way or the other within the panel 10, such collar thus constituting a reciprocating member. As the collar is moved downwardly the window will be lowered into the panel and upon upward movement of the same the window will be raised to close the opening in the part of the car body to which it is attached. As the collar is moved upwardly and approaches the upper limit of its movement it will be understood that the inclined portion 32 of the lug 30 will come in contact with the free end of the dog 40. As further upward movement of the window takes place the dog 40 will be caused to move about its pivot with the result that the window will be forced laterally against the resistance of the springs 20. When the dog 40 comes in contact with the abutment 42 and further upward movement of the same is prevented the free end of the dog will slide upon the inclined surface 32 of the lug 30 with the result that further lateral movement of the window takes place. As the free end of the dog 40 slides over the inclined surface 32 of the lug 30, the latch 34 will be depressed until the end of the dog passes the lower end of the latch when the same will be forced outwardly by the action of the spring 36. At this time the parts occupy the position shown in Figure 3 of the drawing with the hook member 27 positioned above the lip 28 and the free end of the dog beneath the latch. If the window is now slightly lowered the member 27 will engage the lip 28 and the window will be held in its raised position. The dog 40 will also remain in engagement with the inclined surface 32 of the lug 30 beneath the lower end of the latch 34 and the window will thus be locked in its raised position. When it is desired to lower the window the same is raised until the hook member 27 is above the lip 28 and during this operation the dog 40 will pass over the lower end of the lug 30 and return to its lowered position under the influence of the spring 43. As soon as the dog 40 is released from the inclined surface 32 of the lug 30 the coiled springs 20 surrounding the bolts 18 will draw the yoke 19 laterally which will cause the hook member 27 to be moved away from its position above the lip 28. The window is then free to be lowered into the panel by rotation of the shaft 11.

One of the novel features of the invention relates to the means for maintaining the window at any desired point intermediate its extreme positions. In former devices the operating shaft corresponding to shaft 11 has been provided with a single thread which, if made with sufficiently slight lead to hold the window, resulted in slowness of action and caused excessive friction between the shaft and collar, and which if made with sufficient lead to decrease the friction and produce rapid movement of the collar, possessed insufficient friction to maintain the window intermediate its extreme positions. To overcome these difficulties, the shaft 11 of the present construction is provided with a plurality of parallel threads 50, 51, 52, at least two of such threads being employed. This permits the use of threads having a very long lead, with the result that sufficient friction is developed to hold the window at any point desired and at the same time considerable movement of the collar and window results from slight rotation of the shaft.

It is apparent that various modifications in the details of the construction heretofore described may be made within the scope of the invention which is not limited to the particular arrangement disclosed.

Having thus described the invention what is claimed as new and desire to be secured by Letters Patent is:

1. In a construction of the kind described, a hollow panel, a threaded shaft rotatably journaled therein, a threaded collar mounted on said shaft, means for rotating said shaft to move said collar, a window slidably arranged in said panel, a member connecting said window and said collar whereby movement of the latter will raise or lower the window, yieldable means for normally urging said member towards said collar, and means pivotally mounted on the panel for causing lateral movement of said member and the window against the action of said yieldable means as the window is raised and approaches the upper limit of its movement.

2. In a construction of the kind described, a panel, a threaded shaft rotatably journaled therein, a threaded collar mounted on said shaft, means for rotating said shaft, a window slidably arranged in said panel, a member connecting said window and said collar, whereby movement of the collar will raise or lower the window, yieldable means for normally urging said member towards said collar, means secured to the panel for causing lateral movement of the window and said member against the action of said yieldable means as the window is raised and approaches the upper limit of its movement, a lip arranged on said panel, and a hook member mounted on said window and positioned to engage said lip when the window is moved laterally.

3. In a construction of the kind described, a panel, a reciprocating device mounted in said panel, and means for reciprocating the same, a window slidably mounted in said panel, a member connecting said window to said reciprocating device whereby movement of the latter will raise or lower the window, yieldable means for urging said member towards said device, means pivotally mounted in the panel for automatically moving said window and said member laterally against the action of said yieldable means as the window is raised, and means for holding the window in its raised position.

4. In a construction of the kind described, a panel, a reciprocating member mounted therein, means for reciprocating said member, a window slidably mounted in said panel, means connecting said window to said reciprocating member whereby movement of the latter will raise or lower the window, a lug mounted on the lower end of said window and having an inclined face, a dog pivotally secured to said panel and positioned to contact with the inclined face of said lug and force the window laterally as the same is raised, and co-operating means on said window and panel for holding the window in its raised position.

5. In a construction of the kind described, a panel, a window slidably mounted therein, means for raising and lowering the window, a lug arranged on the lower end of the window and having an inclined face, a dog pivoted on said panel and positioned to contact with said inclined face of said lug and move the window laterally as the same is raised, a latch pivoted on said lug and yieldingly projecting beyond the inclined face thereof, the lower end of said latch lying above the lower end of said inclined face, whereby said dog may engage beneath said latch and hold the window in an elevated position.

6. In a construction of the kind described, a panel, a window slidably mounted therein, means for raising and lowering the window, means for yieldingly holding the lower end of the window against lateral movement, a lug mounted on the lower end of the window and having an inclined face, a dog pivoted to said panel and positioned to contact with said inclined face of said lug and move the window laterally against the action of said yielding means, and co-operating means on said frame and window adapted to engage as the window is moved laterally and serving to hold the same in an elevated position.

7. In a construction of the kind described, a panel, a window slidably mounted therein, a threaded shaft journaled in said panel, a threaded collar mounted on said shaft, a yoke yieldingly secured at one end to said collar, the other end of said yoke being attached to the lower end of the window, a member secured to said window, a member secured to said panel, means for forcing the window and yoke laterally as the window is raised whereby said first named member is moved to a position above said second named member, said last named means acting to hold the window in its lateral position while the same is lowered to cause said first named member to engage said last named member.

8. In a construction of the kind described, a panel, a window mounted therein, a threaded shaft journaled in said panel, a threaded collar mounted on said shaft, means for rotating said shaft to raise and lower the collar, a yoke yieldingly secured at one end to said collar, the other end of said yoke being secured to the lower end of said window, means for moving the window and yoke laterally as the window is raised and approaches the upper limit of its movement, said last named means comprising a lug secured to the lower end of the window and having an inclined face and a dog pivoted to the frame and positioned to engage the inclined face of the lug.

9. In a construction of the kind described, a panel, a window slidably mounted therein, means for raising and lowering the window, a lug secured to the lower end of said window and having an inclined face, a dog pivotally mounted on said panel and positioned to engage said lug to force the window laterally as the same is raised, a spring secured to said dog and adapted to move the same out of the path of said window as the window is raised sufficiently to free the dog from the lug.

10. In a construction of the kind described, a panel, a window slidably mounted therein, a lug secured to the lower end thereof and having an inclined face, a spring pressed dog pivoted to the panel and positioned to engage said inclined face of said lug and move the window laterally as the same is raised.

11. In a construction of the kind described, a panel, a window slidably mounted therein, a lug secured to the lower end thereof and having an inclined face, a spring pressed latch secured in said lug and normally projecting beyond the inclined face thereof, a dog pivotally secured to said panel, the free end thereof being positioned to engage the inclined face of said lug and force the window laterally as the same is moved upwardly, a stop for limiting the upward movement of said dog, the free end of the dog being adapted to engage beneath said latch after its upward movement is arrested and the upward movement of the window continued, whereby said window will be locked in elevated position.

12. In a construction of the kind described, a panel, a window slidably mounted therein, a dog pivotally mounted on said panel, means on the power part of said window for engaging the free end of said dog and moving the same about its pivot as the window is raised, whereby the window is moved laterally, a stop for limiting the upward movement of said dog, and means for restoring the dog to its initial position upon further upward movement of the window.

13. In a construction of the kind described, a panel, a window slidably mounted therein, a yoke secured at one end to the lower portion of the window, a reciprocating collar to which the other end of the yoke is secured, means for reciprocating said collar in the panel, yieldable means for urging said yoke towards said collar, and cooperating means on the window and panel for moving said yoke and the window laterally as the window approaches the upper limit of its movement against the action of said yieldable means.

14. In a construction of the kind described, a panel, a window slidably mounted therein, a lug secured thereto and having an inclined face, a latch pivotally secured to said lug and normally projecting beyond the inclined face thereof, a dog pivotally secured to the panel and positioned to contact with the inclined face of said lug and to engage beneath said latch when the window is closed, and means for sliding said window in the panel.

15. In a construction of the kind described, a panel, a threaded shaft rotatably mounted therein, a collar mounted on said shaft and movable by the rotation of the same, a window mounted in the panel, a yoke connecting said window and said device whereby movement of said device will cause movement of the window, yieldable means for urging said yoke towards said collar, a member secured to the lower portion of the window and extending transversely thereof, a member secured to the panel in position to be engaged by said first named member, cooperating means on said panel and window for moving the window and yoke laterally against the action of said resilient means as the window is moved to a closed position whereby said first named member is positioned above said second named member, said last named means serving to hold the window in its lateral position as the same is lowered to bring said members into engagement.

In testimony whereof I affix my signature.

FRANK HUMER.